UNITED STATES PATENT OFFICE.

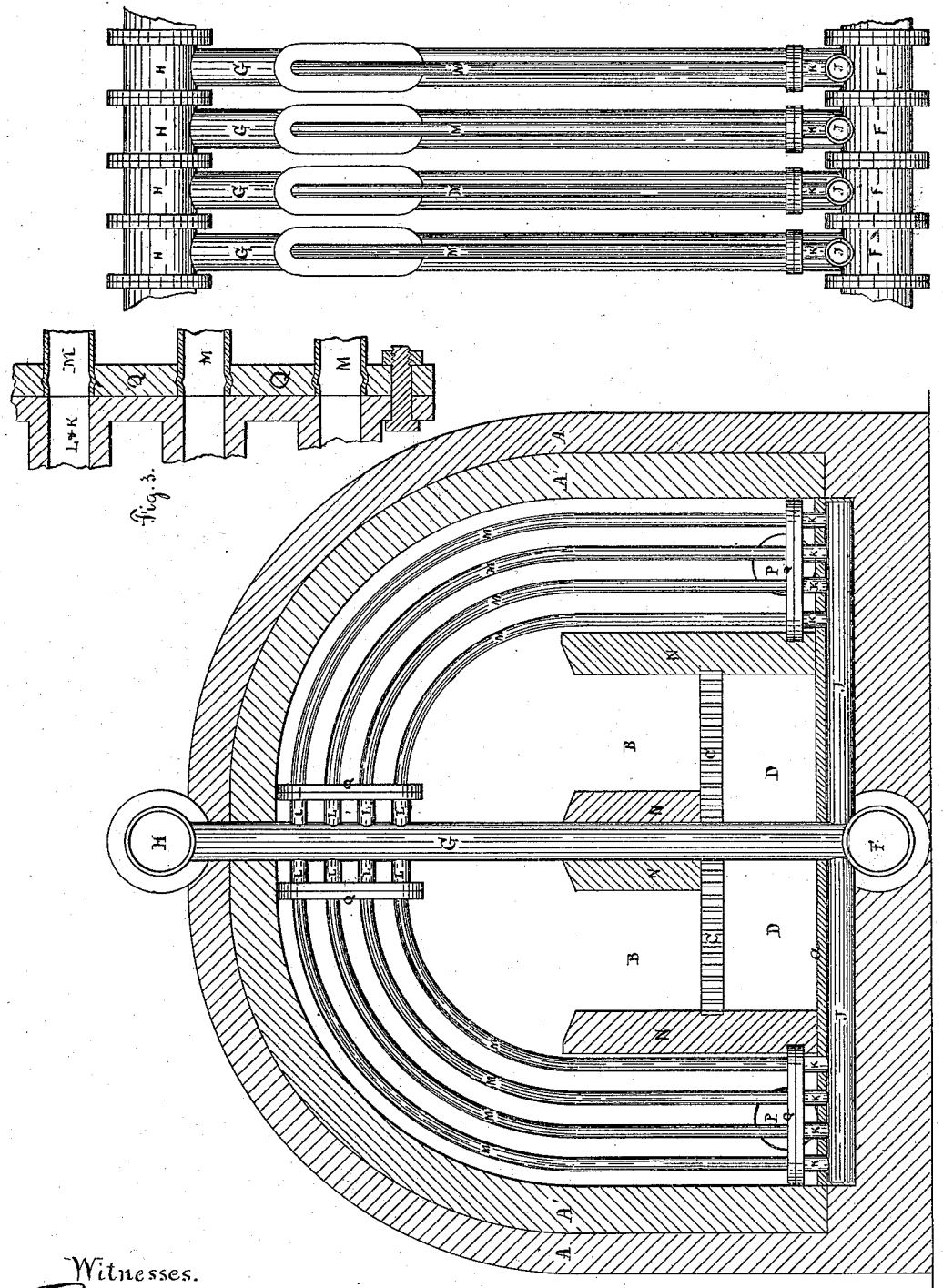

DAVID RENSHAW, OF COHASSET, MASSACHUSETTS.

IMPROVEMENT IN SECTIONAL STEAM-GENERATORS.

Specification forming part of Letters Patent No. 178,251, dated June 6, 1876; application filed November 17, 1875.

*To all whom it may concern:*

Be it known that I, DAVID RENSHAW, of Cohasset, in the county of Plymouth and State of Massachusetts, have invented certain new and useful Improvements in Sectional Steam-Generators; and I do hereby declare that the following is a full, clear, and exact description of the construction and operation of the same, reference being had to the accompanying drawings, wherein—

Figure 1 represents a partial section and front view of my steam-generator. Fig. 2 is a side view, showing some of the sections as put together; and Fig. 3 shows a method of connecting the pipes.

My invention consists, principally, in a new construction of a steam-generator, whereby great economy of construction and other advantages are secured, one portion of the water being exposed in the best manner to the direct and radiant heat of the fire, while another portion is protected from its action, thus insuring certain and regular circulation of the water in the boiler, and a rapid and steady generation of steam.

To effect this object I place my boiler within a reverberatory furnace. A represents the outer wall of the furnace, A' being the fire-brick lining. B B represent the fire-boxes; C C, the grate-bars; D D, the ash-pit, and P P the flues. The boiler is best made in sections, each section consisting of a pipe, F, set beneath the ash-pit floor, as shown, a pipe, G, rising from it, and passing between the two fire-boxes and through the fire-chamber to the pipe H, the pipes J extending horizontally beneath the ash-pit floor, and the pipes M connected, by flanged branches K and L, with the pipes G and J.

I propose to construct all these pipes, except the curved pipes M, of cast-iron, and prefer that they, with their branches and flanges, should be cast in one piece for each section, as this gives the smallest number of joints to plane and put together; but it may be, in some cases, advisable to cast the pipes J in separate pieces, and connect them with the others by flanged joints. I also prefer to cover the pipes J with cement or fire-clay, as shown at *a*. The pipe F serves the purpose of a mud-drum, feed-pipe, and blow-off pipe; and as it is located away from the action of the fire, and below all the other pipes, it will receive all sediment from the boiler as "mud," and retain it as such, in which state it can be easily blown off. The pipe H receives all the steam made by the boiler, and may be used as a steam-drum, or as a pipe to conduct the steam to a drum placed in some more convenient position. The pipes M I prefer to make of thin wrought metal, and expand their ends into flanges, as shown in Fig. 3, which flanges are bolted to the flanges on the branches of pipes G and J.

This method of making sectional boilers is new with me, and is applicable to all sectional boilers which are made of wrought and cast metal pipes; and it consists, in principle, in connecting each of the wrought-iron pipes to a plate adapted to be bolted to the flanged branches of the cast pipes. In Fig. 3, M M are the wrought pipes, L and K are the short pipes or branches of the cast pipes G and J, and Q is a plate of cast-iron, provided with holes to receive the ends of the pipes, all which holes are grooved on their inner surfaces, into which grooves the wrought pipes are expanded, as shown. The sections are put together by bolting together the flanges on the pipes F and H. The fuel in the fire-boxes B B is prevented by fire-bricks N N from coming directly into contact with the pipes G M, thus protecting them from the direct action of the fire; but the gases are burned in the chamber around the upper portion of those pipes, bringing their strongest action to bear on the pipes M, thus causing a rapid ebullition of their contents, and forcing them into the pipes G from opposite directions, breaking up the water-bodies, and allowing the steam to escape into the pipe H, while the water will descend through the pipes G and return through pipes J to pipes M, to be again acted upon by the fire, thus insuring a rapid and complete circulation throughout the boiler.

It will be noticed that this construction exposes one set of pipes to intense heat, while the others are protected from the heat. Upon this feature I rely to gain my rapid circulation, as the difference of temperature to which the pipes are exposed is so great that a constant and regular current will be created.

The details of construction may of course be much altered without departing from the principle of my invention, which is, the arrangement of a lower water-body away from the heat, an upper water-body exposed to the heat, with suitable passages between to admit of circulation.

To produce the best results the pipes M should be numerous, of small diameter, and the pipes G should be of an area equal to the sum of the areas of all the pipes M. Each of the pipes J, also, should be half the area of each of the pipes G, or equal to the sum of the areas of those pipes M which lead from it. The size of the mud-drum F, and of the drum H, depends upon circumstances too well known to need description. I commonly make the pipes M of one inch internal diameter, and use from four to six on each side. The boiler shown in the drawings is eight-horse power.

I claim as my invention—

1. The boiler above described, consisting of the lower water-body F J, protected from the heat, the upper water-body M L G, exposed to the heat, with passages M G between them to admit of circulation, all substantially as described.

2. In a sectional boiler made up of cast and wrought iron pipes, the combination of the cast pipe G, flanged branch L, plate Q, and wrought pipe M, one end of the wrought pipe being expanded to fill a groove in the hole through the plate Q, and the plate Q being bolted to the flanged branch L, all as specified.

DAVID RENSHAW.

Witnesses:
CHAS. F. SLEEPER,
G. B. MAYNADIER.